US011520006B2

(12) United States Patent
Wang et al.

(10) Patent No.: US 11,520,006 B2
(45) Date of Patent: Dec. 6, 2022

(54) METHOD AND APPARATUS FOR GENERATING NON-LINEAR FREQUENCY MODULATION SIGNAL IN REAL TIME AND COMPUTER STORAGE MEDIUM

(71) Applicant: Institute of Electronics, Chinese Academy of Sciences, Beijing (CN)

(72) Inventors: Yu Wang, Beijing (CN); Kaiyu Liu, Beijing (CN); Wei Wang, Beijing (CN); Guodong Jin, Beijing (CN); Yu Sha, Beijing (CN); Yunkai Deng, Beijing (CN); Dacheng Liu, Beijing (CN); Yajun Long, Beijing (CN); Yongwei Zhang, Beijing (CN)

(73) Assignee: Institute of Electronics Chinese Academy of Sciences, Beijing (CN)

( * ) Notice: Subject to any disclaimer, the term of this patent is extended or adjusted under 35 U.S.C. 154(b) by 255 days.

(21) Appl. No.: 16/820,028

(22) Filed: Mar. 16, 2020

(65) Prior Publication Data

US 2021/0003666 A1  Jan. 7, 2021

(30) Foreign Application Priority Data

Jan. 17, 2019 (CN) .......................... 201910045019.0

(51) Int. Cl.
*G01S 7/35* (2006.01)
*G01S 13/90* (2006.01)

(52) U.S. Cl.
CPC ............. *G01S 7/35* (2013.01); *G01S 13/9004* (2019.05)

(58) Field of Classification Search
CPC ........ G01S 7/35; G01S 13/9004; G01S 7/282; G01S 13/90
See application file for complete search history.

(56) References Cited

U.S. PATENT DOCUMENTS 7,880,672 B1 * 2/2011 Doerry ................... G01S 7/282
  342/201
2019/0293774 A1 * 9/2019 Jin ......................... G01S 13/006

FOREIGN PATENT DOCUMENTS

CN   103308891 A   9/2013
CN   105259534 A   1/2016
(Continued)

OTHER PUBLICATIONS

Yutao, Zhu et al. "A Scheme of Designing NLFM Signal by Using FM Function"; Journal of Air Force Radar Academy; p. 44-46, Jun. 30, 2005.
(Continued)

*Primary Examiner* — Timothy A Brainard
(74) *Attorney, Agent, or Firm* — ArentFox Schiff LLP; Michael Fainberg

(57) ABSTRACT

A method and apparatus for generating a NLFM signal in real time, and a computer storage medium are disclosed, including: determining a signal parameter of a signal according to a system parameter, the signal parameter includes: a signal bandwidth, a signal pulse width and a PSLR; determining a power spectrum density function according to PSLR; calculating the power spectrum density function to obtain a group delay vector; calculating a frequency axial vector according to a system sampling rate; calculating a time axial vector according to the signal pulse width; performing linear interpolation calculation on the group delay vector to obtain an instantaneous frequency vector; integrating the instantaneous frequency vector to obtain a phase vector; determining a signal time domain discrete vector; and generating a digital signal according to the signal time domain discrete vector, and performing digital-to-analog conversion on the digital signal to obtain the NLFM signal.

12 Claims, 8 Drawing Sheets

(56) References Cited

FOREIGN PATENT DOCUMENTS

CN 106950544 A 7/2017
CN 108627809 A 10/2018
EP 3144701 A1 * 3/2017 ............. G01S 13/90

OTHER PUBLICATIONS

Xiaopei Zhou; "Realization Technology of Signal Processing in Ground-based Surveillance Radar"; p. 9-14, Jan. 26, 2013.
Dong Wei et al. "Application of Non-linear Frequency-modulation Based Pulse Compression in Air-coupled Ultrasonic Testing"; Journal of Mechanical Engineering; Aug. 31, 2012.
Jun Rong; "Research and Implementation of Multi-waveform Pulse Compression"; Mar. 2004.
Qian Zhao et al. MATLAB foundation and simulation application in communication system; p. 230, Mar. 31, 2010.

* cited by examiner

METHOD AND APPARATUS FOR GENERATING NON-LINEAR FREQUENCY MODULATION SIGNAL IN REAL TIME AND COMPUTER STORAGE MEDIUM

CROSS-REFERENCE TO RELATED APPLICATION

The present application claims benefit of Chinese Patent Application No. 201910045019.0, filed on Jan. 17, 2019, the contents of which are hereby incorporated by reference in their entirety.

TECHNICAL FIELD

The disclosure relates to the technical field of signal processing, and in particular to a method and an apparatus for generating a Non-Linear Frequency Modulation (NLFM) signal in real time, and a computer storage medium.

BACKGROUND

A Synthetic Aperture Radar (SAR) can observe the earth in all day-and-night, all weathers and all over the globe, and is applied widely. At present, a Linear Frequency Modulation (LFM) signal have a transmitting waveform that is most commonly used in an SAR system. For a response function generated by such a waveform via matched filtering, a Peak Side Lobe Ratio (PSLR) after normalization is −13 decibels (dBs). In order to suppress a height of a side lobe, a weighted window function, an adaptive filtering algorithm and an optimization algorithm are often used. However, these methods will make a matched filter unmatched and reduce the Signal to Noise Ratio (SNR) of the output.

Compared with the LFM signal, a very small PSLR may be obtained by a pulse compression of an NLFM signal, and the SNR of the output is not reduced in this process. From relevant experiments, the NLFM signal may reduce a loss of the SNR by 1-2 dB, which means that 25% of transmitted power of an antenna is saved. For the energy starved radar system, the system performance may be improved by using the NLFM signal as the transmitting waveform.

Presently, a common technical method for producing the NLFM signal includes the following operations: a discrete value of the signal is obtained by a calculation process at ground, and then stored in a Read-Only Memory (ROM) of a Field-Programmable Gate Array (FPGA). In use, discrete data stored in the ROM is read, and subjected to digital-to-analog conversion to generate the NLFM signal. For such a method, the signal needs to be collected and stored first and then invoked and converted to generate the NLFM signal. The method is restricted by a limited storage space of the ROM. Due to the storage mode, the NLFM signal can only be used in a scientific experiment, and cannot be promoted in engineering.

Therefore, how to decrease time for generating the NLFM signal so as to generate the NLFM signal in real-time is a problem to be solved urgently at present.

SUMMARY

The embodiments of the disclosure provide a method and an apparatus for generating an NLFM signal in real time.

The embodiments of the disclosure provide a method for generating an NLFM signal in real time, which includes the following operations.

A signal parameter of a signal is determined according to a system parameter, the signal parameter at least includes: a signal bandwidth, a signal pulse width and a PSLR.

A power spectrum density function is determined according to the PSLR.

The power spectrum density function is calculated to obtain a group delay vector.

A frequency axial vector is calculated according to a system sampling rate.

A time axial vector is calculated according to the signal pulse width.

Linear interpolation calculation is performed on the group delay vector by using the frequency axial vector and the time axial vector, to obtain an instantaneous frequency vector.

The instantaneous frequency vector is integrated to obtain a phase vector.

A signal time domain discrete vector is determined according to the phase vector.

A digital signal is generated according to the signal time domain discrete vector, and digital-to-analog conversion is performed on the digital signal to obtain the NLFM signal.

In the above-mentioned solutions, the operation that a power spectrum density function is determined according to the PSLR includes the following operation.

A window function corresponding to the PSLR is obtained according to the PSLR, and the power spectrum density function is determined according to the window function.

In the above-mentioned solutions, the operation that the power spectrum density function is calculated to obtain a group delay vector includes the following operation.

Discrete integration is performed on the power spectrum density function to obtain the group delay vector.

In the above-mentioned solutions, the operation that linear interpolation calculation is performed on the group delay vector by using the frequency axial vector and the time axial vector to obtain an instantaneous frequency vector includes the following operations.

The group delay vector is divided into n group delay subvectors, n is a positive integer greater than 1.

The linear interpolation calculation is performed on the n group delay subvectors respectively by using the frequency axial vector and the time axial vector to obtain n instantaneous frequency vectors.

The operation that the instantaneous frequency vector is integrated to obtain a phase vector includes the following operation.

The n instantaneous frequency vectors are respectively integrated, and integrated results are spliced to obtain the phase vector.

The embodiments of the disclosure provide an apparatus for generating an NLFM signal in real time, which includes: a processor; a memory for storing instructions; and a digital to analog converter, wherein the processor is configured to execute the instructions to: determine a signal parameter of a signal according to a system parameter, the signal parameter at least includes: a signal bandwidth, a signal pulse width and a PSLR; determine a power spectrum density function according to the PSLR; calculate the power spectrum density function to obtain a group delay vector; calculate a frequency axial vector according to a system sampling rate; calculate a time axial vector according to the signal pulse width; perform linear interpolation calculation on the group delay vector by using the frequency axial vector and the time axial vector to obtain an instantaneous frequency vector; integrate the instantaneous frequency vector to obtain a phase vector; determine a signal time domain discrete vector according to the phase vector; and generate a digital signal according to the signal time domain discrete vector, and perform digital-to-analog conversion on the digital signal to obtain the NLFM signal via the digital to analog converter.

In the above-mentioned solutions, the processor is further configured to execute the instructions to: obtain a window function corresponding to the PSLR according to the PSLR, and determine the power spectrum density function according to the window function.

In the above-mentioned solutions, the processor is further configured to execute the instructions to: perform discrete integration on the power spectrum density function to obtain the group delay vector.

In the above-mentioned solutions, the processor is further configured to execute the instructions to divide the group delay vector into n group delay subvectors, n is a positive integer greater than 1; and perform, by using the frequency axial vector and the time axial vector, the linear interpolation calculation on the n group delay subvectors respectively, to obtain n instantaneous frequency vectors.

The processor is further configured to execute the instructions to integrate the n instantaneous frequency vectors respectively, and splice integrated results to obtain the phase vector.

The embodiments of the disclosure provide a computer readable storage medium having computer programs stored thereon; and the computer programs implement, when being executed by a processor, any operation of the method for generating the NLFM signal in real time in the above-mentioned solutions.

BRIEF DESCRIPTION OF THE DRAWINGS

The accompanying drawings generally show the embodiments discussed in the specification in an illustrative manner rather than a restrictive manner.

DETAILED DESCRIPTION

In order to understand the characteristics and technical contents in the embodiments of the disclosure more specifically, the implementation for each embodiment of the disclosure will be described below in detail in combination with the accompanying drawings. The accompanying drawings are merely for reference, rather than a limit for the embodiments of the disclosure.

Figure 1:
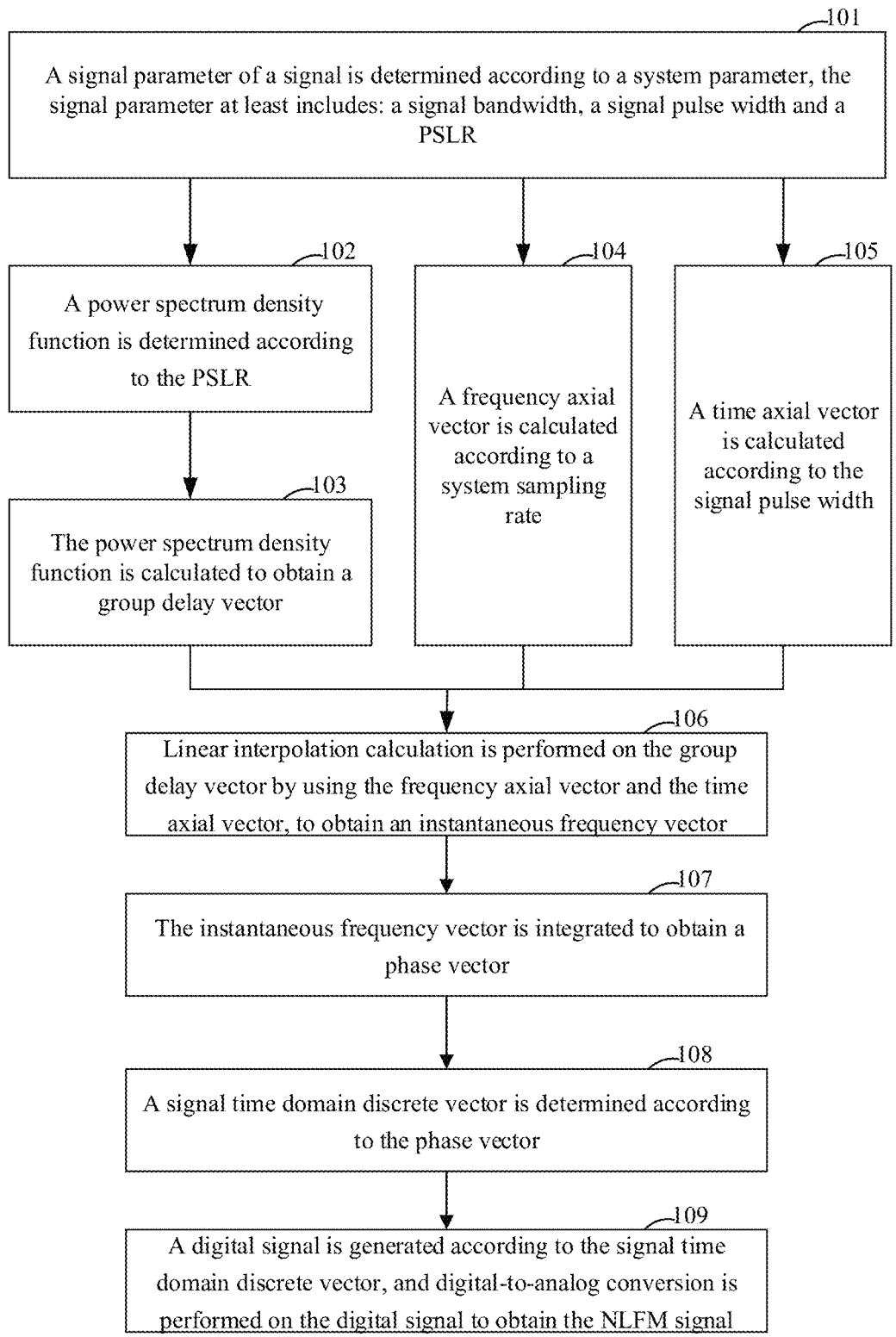
FIG. 1 schematically illustrates a flowchart of a method for generating an NLFM signal in real time according to an embodiment of the disclosure.

The embodiments of the disclosure provide a method for generating an NLFM signal in real time. As shown in FIG. 1, the method includes the following operations.

At Operation 101: a signal parameter of a signal is determined according to a system parameter, the signal parameter at least includes: a signal bandwidth, a signal pulse width and a PSLR. The system is a radar system, and the signal is a signal transmitted by the system.

In some embodiments, the parameter of the radar system is a parameter of an SAR system.

In some embodiments, the signal is a radar transmitting signal.

Specifically, the system parameter refers to a parameter related to the signal in the SAR system, the system parameter may include an SNR and a range resolution. The SNR is an SNR output by the radar system, and is used for determining a pulse width of the signal, that is, determining the signal pulse width. The range resolution refers to a minimum space for distinguishing two targets at different distances, and is used for determining the signal bandwidth.

In the embodiments of the present disclosure, the B denotes the signal bandwidth, and the $T_p$ denotes the signal pulse width.

At Operation 102: a power spectrum density function is determined according to the PSLR.

In some embodiments, the operation 102 includes the following operations: a window function corresponding to the PSLR is obtained according to the PSLR, and the power spectrum density function is determined according to the window function.

Herein, the window function corresponding to the PSLR is obtained according to the PSLR based on correspondence between PSLRs and window functions, which is set in advance.

In some embodiments, the correspondence between PSLRs and window functions may be set in a correspondence table. When there is a need to obtain a window function, a required PSLR is used as an index, and a window function corresponding to a PSLR having a value same as the required PSLR is found in the correspondence table.

The window function may include: a Hamming window, a Kaiser window and a Taylor window.

At Operation 103: the power spectrum density function is calculated to obtain a group delay vector.

In some embodiments, the operation 103 includes an operation that discrete integration is performed on the power spectrum density function to obtain the group delay vector.

Specifically, the group delay may be calculated according to the power spectrum density function by a formula (1):

$$G(f) = \int_0^f \frac{P(f)}{C} df \quad (1)$$

Where, the f denotes a frequency, the P(f) denotes a power spectrum density function with the frequency as an independent variable, and the C is an inverse proportional coefficient, and may be denoted by a formula (2):

$$C = \frac{1}{T_p} \int_{B/2}^{-B/2} P(f) df \quad (2)$$

During hardware implementation, discrete integration may be used and the group delay may be denoted as a group delay vector $\vec{g}$, where, the $\vec{g}$ may be denoted by a formula (3):

$$\vec{g} = (g_0, g_1, \ldots, g_i) \quad (3)$$

Where, $0 \leq i \leq N-1$, the $g_i$ denotes a discrete value of G(f) and the N is the number of sampling points; and $N = \lfloor F_s T_p \rfloor$, where the $\lfloor \bullet \rfloor$ denotes to round down.

In some embodiments, a Taylor window function may be selected as the power spectrum density function, and a corresponding group delay function G(f) may be denoted by a formula (4):

$$G(f) = \frac{T_p}{B} f + \sum_{m=1}^{\overline{m}-1} \frac{F_m T_p}{\pi m} \sin\left(\frac{2\pi m}{B} f\right) \quad (4)$$

Where, the $F_m$ is a Taylor window coefficient, the $\overline{m}$ is the number of side lobes having a same height, and the m is a calculation process quantity.

At Operation 104: a frequency axial vector is calculated according to a system sampling rate.

The frequency axial vector $\vec{f}$ is calculated according to the system sampling rate $F_s$, wherein the $\vec{f}$ may be denoted by a formula (5):

$$\vec{f}[f_0, f_1, \ldots, f_i] \quad (5)$$

Where $$0 \leq i \leq N-1, f_i = -\frac{F_s}{2} + i \times \frac{F_s}{N}.$$

The system sampling rate $F_s$ is a default value set when the system is designed. In some embodiments, the system sampling rate $F_s$ may be determined based on the system parameter.

At Operation 105: a time axial vector is calculated according to the signal pulse width.

The time axial vector $\vec{t}$ may be denoted by a formula (6):

$$\vec{t} = [t_0, t_1, \ldots, t_i] \quad (6)$$

Where, $$0 \leq i \leq N-1, t_i = -\frac{T_p}{2} + i \times \frac{1}{F_s}.$$

At Operation 106: linear interpolation calculation is performed on the group delay vector by using the frequency axial vector and the time axial vector to obtain an instantaneous frequency vector.

Linear interpolation is performed on the group delay vector $\vec{g}$ according to the frequency axial vector $\vec{f}$, the time axial vector $\vec{t}$, to calculate the instantaneous frequency vector $\vec{F}$, wherein the $\vec{F}$ may be denoted by a formula (7):

$$\vec{F} = (f_{t_0}, f_{t_1}, \ldots, f_{t_i}) = \text{interp1}[\vec{g}, \vec{f}, \vec{t}] \quad (7)$$

Where, the interp1 function is a one-dimensional linear interpolation function; and a correspondence between horizontal and vertical coordinates is determined based on ($\vec{f}$, $\vec{g}$) within a two-dimensional coordinate plane, a vertical coordinate corresponding to a horizontal coordinate $\vec{t}$ calculated via linear interpolation is:

$$\vec{F} = \text{interp1}[\vec{g}, \vec{f}, \vec{t}]$$

Further, the vertical coordinate $f_{t_i}$ corresponding to the horizontal coordinate $t_i$ may be denoted by a formula (8):

$$f_{t_i} = \frac{g_p - g_q}{f_p - f_q} \times t_i \quad (8)$$

The $t_i$ falls into an interval $[g_p, g_p]$, $0 \leq q \leq i \leq p \leq N-1$, and the $f_p$ and the $f_q$ are vertical coordinates corresponding to horizontal coordinate $g_p$ and $g_q$, respectively.

At Operation 107: the instantaneous frequency vector is integrated to obtain a phase vector.

The signal phase vector $\vec{\phi}$ is obtained by integrating according to the instantaneous frequency vector, and the $\vec{\phi}$ may be denoted by a formula (9):

$$\vec{\phi} = [\phi_0, \phi_1, \ldots, \phi_i] \quad (9)$$

Where, when $i=0$, $\phi_0=0$.
When $1 \leq i \leq N-1$, $$\phi_i = \pi(f_{t_i} + f_{t_{i-1}}) \times \frac{1}{F_s} + \phi_{i-1}.$$

In some embodiments, the operation 106 includes the following operations.

The group delay vector $\vec{g}$ is divided into n group delay subvectors, the n is a positive integer greater than 1.

The linear interpolation calculation is respectively performed on the n group delay subvectors by using the frequency axial vector $\vec{f}$ and the time axial vector $\vec{t}$ to obtain n instantaneous frequency vectors.

The operation 107 includes the following operation.

The n instantaneous frequency vectors are respectively integrated, and integrated results are spliced to obtain the phase vector $\vec{\phi}$.

In some embodiments, with n=2 as an example: the signal phase vectors, i.e. $\vec{\phi}_1 = [\phi_0, \phi_1, \ldots, \phi_h]$ and $\vec{\phi}_2 = [\phi_{h+1}, \phi_{h+2}, \ldots, \phi_i]$ are calculated by using two instantaneous frequency vectors obtained in the operation 106, where $0 \leq h \leq i \leq N-1$. Supposing that $\phi_0 = 0$ and $\phi_{h+1} = 0$ are set in advance, the $\vec{\phi}_1$ and the $\vec{\phi}_2$ may be respectively calculated as per the operation 107. At last, a final value of the $\vec{\phi}_1$ serves as an initialized value $\vec{\phi}_2 = [\phi_{h+1}, \phi_{h+2}, \ldots, \phi_i] + \phi_h$ of the $\vec{\phi}_2$; and as a consequence, the $\vec{\phi}_1$ and the $\vec{\phi}_2$ are directly spliced into an integral phase vector $\vec{\phi}$.

At Operation 108: a signal time domain discrete vector is determined according to the phase vector.

Specifically, the signal time domain discrete vector $\vec{s}$ may be denoted by a formula (9):

$$s = [s_0, s_1, \ldots, s_i] \quad (10)$$

Where, $0 \leq i \leq N-1$, $S_i = \exp(j2\pi\phi_i)$.

At Operation 109: a digital signal is generated according to the signal time domain discrete vector, and digital-to-analog conversion is performed on the digital signal to obtain the NLFM signal.

The digital-to-analog conversion means that a discrete digital quantity is converted into an analog quantity that is changed continuously. In some embodiments, the digital-to-analog conversion may be performed via a Digital to Analog Converter (DAC).

Generating in real-time means generating within a limited time, and the range of the limited time is determined according to an actual demand. In this embodiment of the disclosure, for the real-time generation of the NLFM signal, the limited time range is determined with a computer processing speed and a communication transmitting speed of the radar system as a standard, and generally reaches to a microsecond.

Figure 2:
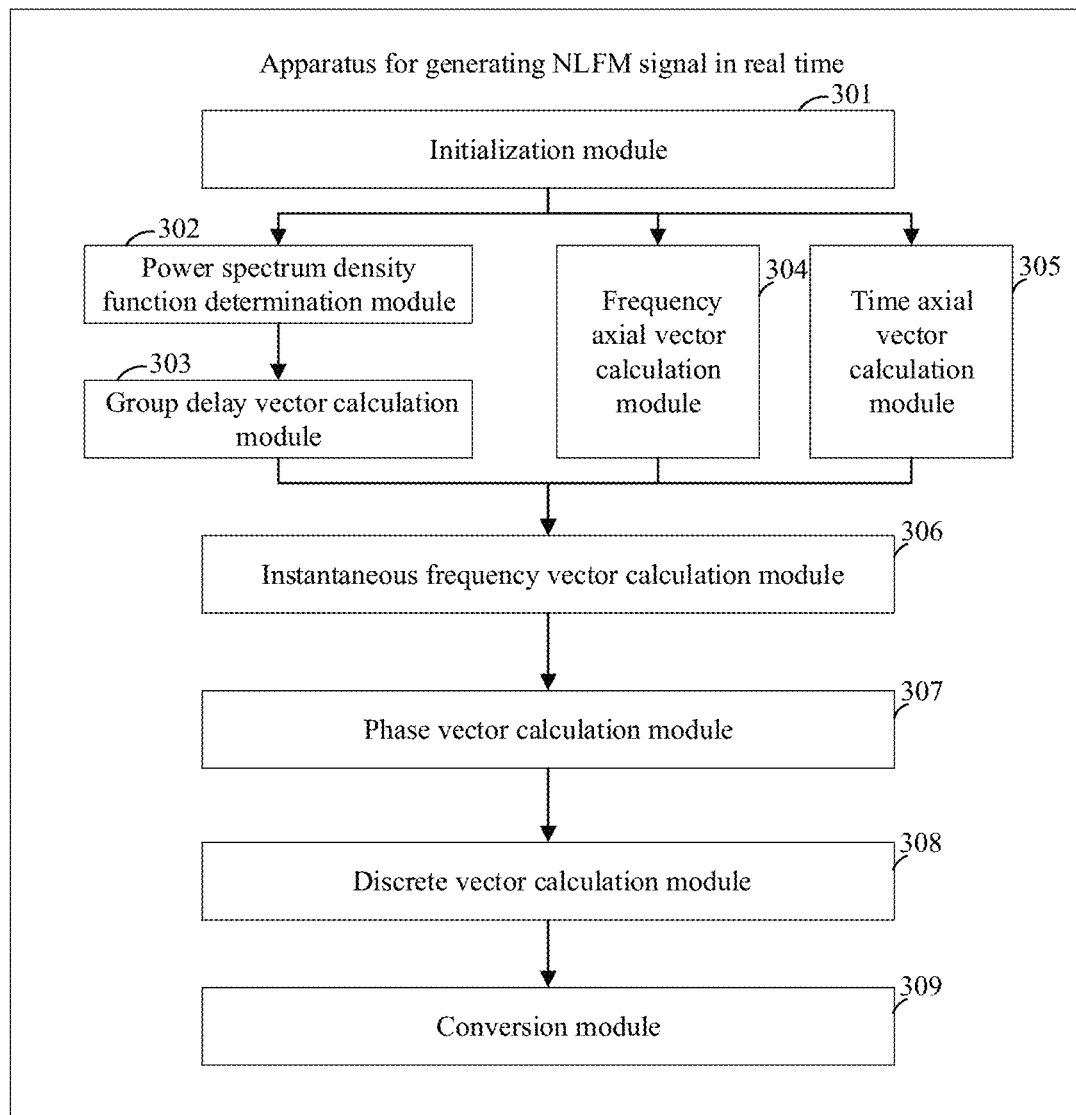
FIG. 2 schematically illustrates a structural diagram of an apparatus for generating an NLFM signal in real time according to an embodiment of the disclosure.

The embodiments of the disclosure provide an apparatus for generating an NLFM signal in real time. As shown in FIG. 2, the apparatus includes: an initialization module 301, a power spectrum density function determination module 302, a group delay vector calculation module 303, a frequency axial vector calculation module 304, a time axial vector calculation module 305, an instantaneous frequency vector calculation module 306, a phase vector calculation module 307, a discrete vector calculation module 308, and a conversion module 309.

The initialization module 301 is configured to determine a signal parameter of a signal according to a system parameter, the signal parameter at least includes: a signal bandwidth, a signal pulse width and a PSLR.

In the embodiments of the disclosure, the B denotes the signal bandwidth, and the $T_p$ denotes the signal pulse width.

The power spectrum density function determination module 302 is configured to determine a power spectrum density function according to the PSLR.

In some embodiments, the power spectrum density function determination module 302 is specifically configured to: obtain a window function corresponding to the PSLR according to the PSLR, and determine the power spectrum density function according to the window function.

Herein, the window function corresponding to the PSLR may be obtained according to the PSLR based on correspondence between PSLRs and window functions, which is set in advance.

In some embodiments, the correspondence between PSLRs and window functions may be set in a correspondence table. When there is a need to obtain the window function, a required PSLR is used as an index, and the window function corresponding to the PSLR having a value same as the required PSLR is found in the corresponding table.

The window function may include: a Hamming window, a Kaiser window and a Taylor window.

The group delay vector calculation module 303 is configured to calculate the power spectrum density function to obtain a group delay vector.

In some embodiments, the group delay vector calculation module 303 is specifically configured to: perform discrete integration on the power spectrum density function to obtain the group delay vector.

Specifically, the group delay may be calculated according to the power spectrum density function as per a formula (1).

During hardware implementation, discrete integration may be used and the group delay may be denoted as a group delay vector $\vec{g}$, where, the $\vec{g}$ may be denoted by a formula (3).

In some embodiments, a Taylor window function may be selected as the power spectrum density function, and a corresponding group delay function G(f) may be denoted by a formula (4).

The frequency axial vector calculation module 304 is configured to calculate a frequency axial vector according to a system sampling rate.

In some embodiments, the frequency axial vector calculation module 304 is specifically configured to: calculate the frequency axial vector $\vec{f}$ according to the system sampling rate $F_s$, wherein the $\vec{f}$ may be denoted by a formula (5).

The time axial vector calculation module 305 is configured to calculate a time axial vector according to the signal pulse width.

In some embodiments, the time axial vector $\vec{t}$ may be denoted by a formula (6).

The instantaneous frequency vector calculation module 306 is configured to perform linear interpolation calculation on the group delay vector by using the frequency axial vector and the time axial vector to obtain an instantaneous frequency vector.

In some embodiments, the instantaneous frequency vector calculation module 306 is specifically configured to: perform linear interpolation to the group delay vector $\vec{g}$ according to the frequency axial vector $\vec{f}$, the time axial vector $\vec{t}$, to calculate the instantaneous frequency vector $\vec{F}$, wherein the instantaneous frequency vector may be denoted by a formula (7).

The interp1 function is a one-dimensional linear interpolation function; and a correspondence between horizontal and vertical coordinates is determined based on $(\vec{g}, \vec{f})$ within a two-dimensional coordinate plane, a vertical coordinate corresponding to a horizontal coordinate $\vec{t}$ is calculated via linear interpolation as $\vec{F}=\mathrm{interp1}[\vec{g}, \vec{f}, \vec{t}]$ Further, the corresponding vertical coordinate $f_i$, corresponding to the horizontal coordinate $t_i$ may be denoted by a formula (8).

The phase vector calculation module 307 is configured to integrate the instantaneous frequency vector to obtain a phase vector.

In some embodiments, the phase vector calculation module 307 is specifically configured to: perform integrating according to the instantaneous frequency vector to obtain the signal phase vector $\vec{\phi}$, and the $\vec{\phi}$ may be denoted by a formula (9).

In some embodiments, the instantaneous frequency vector calculation module 306 is further configured to: divide the group delay vector $\vec{g}$ into n group delay subvectors, n is a positive integer greater than 1; and respectively perform the linear interpolation calculation on the n group delay subvectors by using the frequency axial vector $\vec{f}$ and the time axial vector $\vec{t}$ to obtain n instantaneous frequency vectors.

The phase vector calculation module 307 is further configured to: integrate the n instantaneous frequency vectors respectively, and splice integrated results to obtain the phase vector $\vec{\phi}$.

The discrete vector calculation module 308 is configured to determine a signal time domain discrete vector according to the phase vector. Specifically, the signal time domain discrete vector $\vec{s}$ may be denoted by a formula (9).

The conversion module 309 is configured to generate a digital signal according to the signal time domain discrete vector, and perform digital-to-analog conversion on the digital signal to obtain the NLFM signal.

Figure 3:
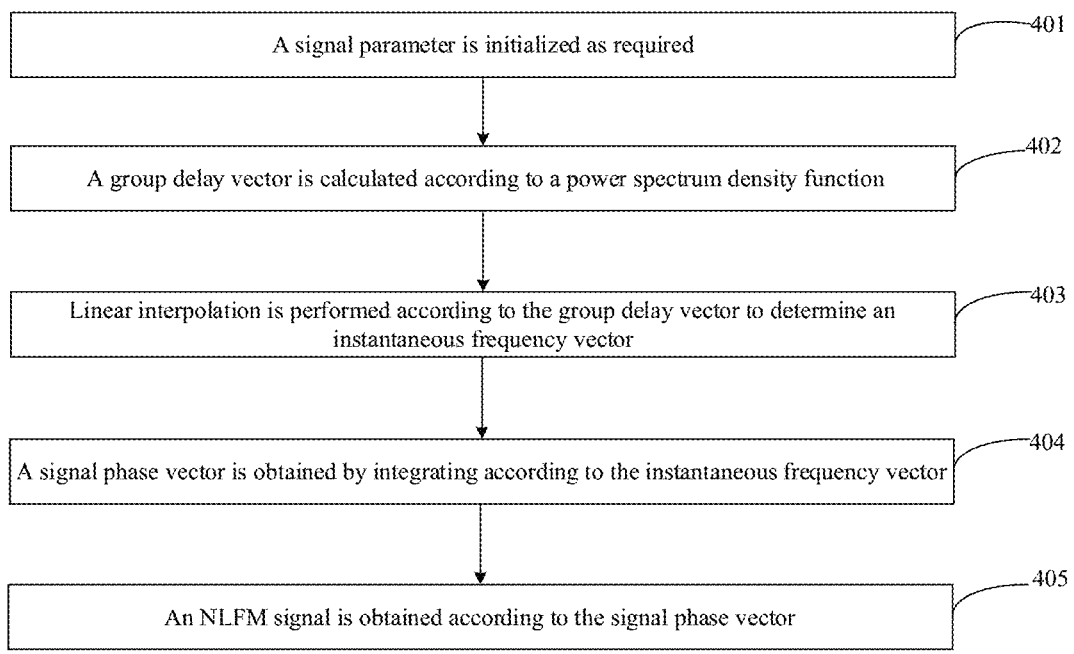
FIG. 3 schematically illustrates a flowchart of a method for generating a time domain signal according to an embodiment of the disclosure.

The embodiments of the disclosure provide a method for generating a time domain signal, which may be applied to hardware implementation. As shown in FIG. 3, the method includes the following operations.

At Operation 401: a signal parameter is initialized as required.

In this embodiment of the disclosure, the operation 401 that a signal parameter is initialized as required includes an operation that a required signal parameter is determined according to a system parameter such as an SNR and a range resolution, the signal parameter includes a signal bandwidth B, a signal pulse width $T_p$ and a PSLR; and a power spectrum density function is determined according to the PSLR.

At Operation 402: a group delay vector is calculated according to a power spectrum density function.

Specifically, the group delay may be calculated according to the power spectrum density function determined in the operation 401 as per a following formula.

$$G(f) = \int_0^f \frac{P(f)}{C} df$$

Where, the P(f) denotes a power spectrum density function. In some embodiments, a window function (for example, a Hamming window, a Kaiser window, a Taylor window etc.) may be used as the power spectrum density function. The C is an inverse proportional coefficient, $$C = \frac{1}{T_p} \int_{B/2}^{-B/2} P(f) df.$$

In some embodiments, during hardware implementation, discrete integration may be used and the group delay may be denoted as a group delay vector $\vec{g} = (g_0, g_1, \ldots, g_i)$, where, $0 \le i \le N-1$, the $g_i$ denotes a discrete value of G(f) and the N is the number of sampling points; and $N = \lfloor F_s T_p \rfloor$, where the $\lfloor \cdot \rfloor$ denotes to round down.

In some embodiments, a Taylor window function may be selected as the power spectrum density function, and a corresponding group delay function may be denoted as $$G(f) = \frac{T_p}{B} f + \sum_{m=1}^{m-1} \frac{F_m T_p}{\pi m} \sin\left(\frac{2\pi m}{B} f\right).$$

Where, the $F_m$ is a Taylor window coefficient, the $\overline{m}$ is the number of side lobes having a same height, and the m is a calculation process quantity.

At Operation 403: linear interpolation is performed according to the group delay vector to determine an instantaneous frequency vector.

Specifically, a frequency axial vector $\vec{f}$ calculated according to the signal pulse width, the signal bandwidth and the system sampling rate $F_s$ is $$\vec{f} = [f_0, f_1, \ldots, f_i]$$

Where, $0 \le i \le N-1$, $$f_i = -\frac{F_s}{2} + i \times \frac{F_s}{N}.$$

A time axial vector $\vec{t}$ is $$\vec{t} = [t_0, t_1, \ldots, t_i]$$

Where, $0 \le i \le N-1$, $$t_i = -\frac{T_p}{2} + i \times \frac{1}{F_s}.$$

The linear interpolation is performed on the group delay vector $\vec{g}$ according to the frequency axial vector $\vec{f}$, the time axial vector $\vec{t}$, to calculate the instantaneous frequency vector $\vec{F}$ as $$\vec{F} = (f_{t_0}, f_{t_1}, \ldots, f_{t_i}) = \text{interp1}[\vec{g}, \vec{f}, \vec{t}]$$

The interp1[$\vec{g}$, $\vec{f}$, $\vec{t}$] denotes a one-dimensional linear interpolation operator. Particularly, according to correspondence between horizontal and vertical coordinates is determined according to ($\vec{g}$, $\vec{f}$) within a two-dimensional coordinate plane, a vertical coordinate, corresponding to a horizontal coordinate $\vec{t}$, calculated via linear interpolation is $\vec{F} = \text{interp1}[\vec{g}, \vec{f}, \vec{t}]$ Further, the vertical coordinate $f_t$, corresponding to the horizontal coordinate $t_i$ is $$f_{t_i} = \frac{g_p - g_q}{f_p - f_q} \times t_i.$$

Figure 4:
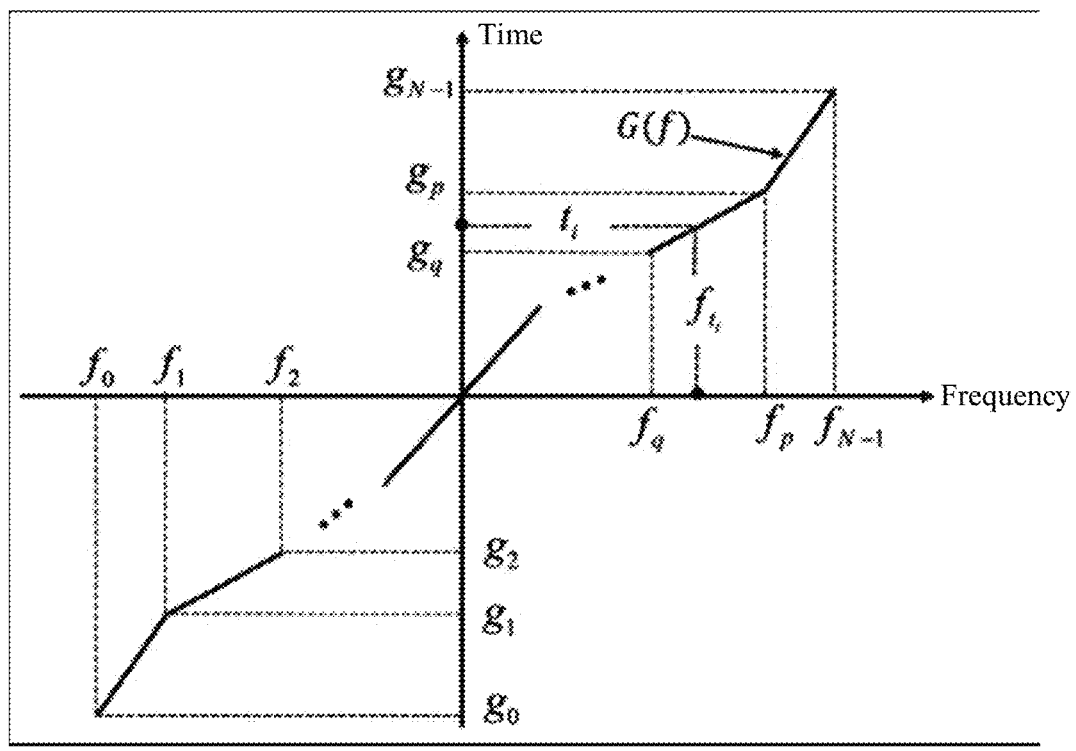
FIG. 4 schematically illustrates a plane effect of a linear interpolation algorithm according to an embodiment of the disclosure.

The $t_i$ falls into an interval $[g_p, g_q]$, $0 \le q \le i \le p \le N-1$, and the $f_p$ is a vertical coordinate corresponding to horizontal coordinates $g_p$ and the $f_q$ is a vertical coordinate corresponding to horizontal coordinates $g_q$. The correspondence is as shown in FIG. 4, a curve of a discrete value of the G(f) is within a coordinate system, and the $f_{t_i}$ is determined according to the $t_i$.

Particularly, piecewise interpolation may be performed to implement concurrent processing.

At Operation 404: a signal phase vector $\vec{\phi} = [\phi_0, \phi_1, \ldots, \phi_i]$ is obtained by integrating according to the instantaneous frequency vector, which specifically includes the following operations.

When $i = 0$, $\phi_0 = 0$.

When $i = 1$, $\phi_1 = \pi(f_{t_1} + f_{t_0}) \times \frac{1}{F_s} + \phi_0$.

When $i = 2$, $\phi_2 = \pi(f_{t_2} + f_{t_1}) \times \frac{1}{F_s} + \phi_1$.

...

When $1 \le i \le N-1$, $\phi_i = \pi(f_{t_i} + f_{t_{i-1}}) \times \frac{1}{F_s} + \phi_{i-1}$.

Particularly, it may be appropriate to block for concurrent calculation herein. Instantaneous frequency vectors calculated by blocking in the step 403 are used to calculate the signal phase vector. For example, two blocks are provided to calculate $\vec{\phi}_1=[\phi_0, \phi_1, \ldots, \phi_h]$ and $\vec{\phi}_2=[\phi_{h+1}, \phi_{h+2}, \ldots, \phi_i]$, where $0\leq h\leq i\leq N-1$. In a case where $\phi_0=0$ and $\phi_{h+1}=0$ are set first, the $\vec{\phi}_1$ and the $\vec{\phi}_2$ are calculated by blocking according to an integration process in the step 404; then, a final value of the $\vec{\phi}_1$ serves as an initialized value of the $\vec{\phi}_2$ to obtain $\vec{\phi}_2=[\phi_{h+1}, \phi_{h+2}, \ldots, \phi_i]+\phi_h$; and at last, the $\vec{\phi}_1$ and the $\vec{\phi}_2$ are directly spliced into an integral phase vector $\vec{\phi}$.

At Operation 405: an NLFM signal is obtained according to the signal phase vector.

In some embodiments, the operation 405 includes an operation that a signal time domain discrete vector is determined according to a signal phase.

In some embodiments, the signal time domain discrete vector $\vec{s}$ may be denoted as $\vec{s}=[s_0, s_1, \ldots, s_i]$, where, $0\leq i\leq N-1$ and $S_i=\exp(j2\pi\phi_i)$.

Figure 5:
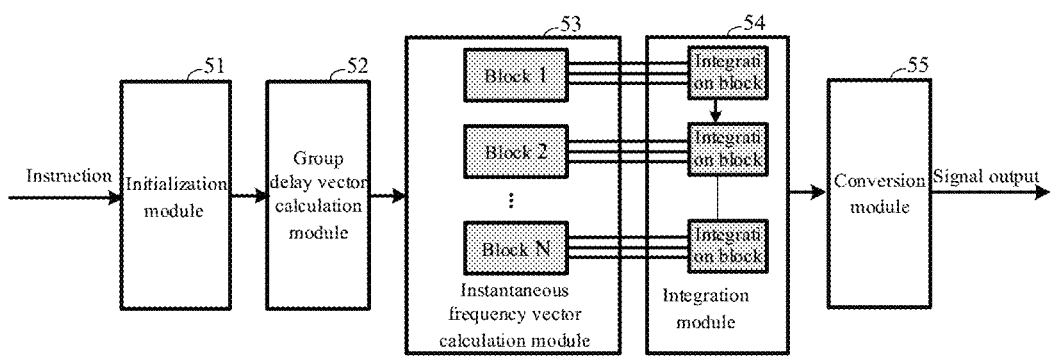
FIG. 5 schematically illustrates a structural diagram of an apparatus implemented based on FPGA hardware according to an embodiment of the disclosure.

The embodiments of the disclosure provide an apparatus implemented based on FPGA hardware. As shown in FIG. 5, the apparatus includes: an initialization module 51, a group delay vector calculation module 52, an instantaneous frequency vector calculation module 53, an integration module 54, and a conversion module 55.

The initialization module 51 is configured to initialize a signal parameter as required.

For example, the initialization module 51 is configured to determine a required signal parameter according to a system parameter such as an SNR and a range resolution, the signal parameter includes a signal bandwidth B, a signal pulse width p and a PSLR; and determine a power spectrum density function according to the PSLR. In practice, the signal parameter can be determined according to an instruction parameter sent by a serial port of an upper computer.

The group delay vector calculation module 52 is configured to calculate a group delay vector according to the power spectrum density function.

Specifically, the group delay may be calculated according to the power spectrum density function as per a following formula.

$$G(f) = \int_0^f \frac{P(f)}{C} df$$

Where, the f denotes a frequency, and the P(f) denotes a power spectrum density function with the frequency as an independent variable. In some embodiments, a window function (for example, a Hamming window, a Kaiser window and a Taylor window) may be used as the power spectrum density function. The C is an inverse proportional coefficient, $$C = \frac{1}{T_p} \int_{B/2}^{-B/2} P(f) df.$$

In some embodiments, during hardware implementation, discrete integration may be used and the group delay is denoted as a group delay vector $\vec{g}=(g_0, g_1, \ldots, g_i)$, where, $0\leq i\leq N-1$, the $g_i$ denotes a discrete value of G(f) and the N is the number of sampling points; and $N=\lfloor F_s T_p \rfloor$, where the $\lfloor \cdot \rfloor$ denotes to round down.

In some embodiments, a Taylor window function may be selected as the power spectrum density function, and a corresponding group delay function may be denoted as $$G(f) = \frac{T_p}{B} f + \sum_{m=1}^{\overline{m}-1} \frac{F_m T_p}{\pi m} \sin\left(\frac{2\pi m}{B} f\right).$$

Where, the $F_m$ is a Taylor window coefficient, the $\overline{m}$ is the number of side lobes having a same height, and the m is a calculation process quantity.

The instantaneous frequency vector calculation module 53 is configured to perform linear interpolation according to the group delay vector to determine an instantaneous frequency vector. In some embodiments, the instantaneous frequency vector calculation module 53 may include multiple blocks.

Specifically, according to signal pulse width, signal bandwidth and system sampling rate $F_s$, a frequency axial vector $\vec{f}$ is calculated as $$\vec{f}=[f_0, f_1, \ldots, f_i]$$

Where, $0\leq i\leq N-1$, $$f_i = -\frac{F_s}{2} + i \times \frac{F_s}{N}.$$

A time axial vector $\vec{t}$ is $$\vec{t}=[t_0, t_1, \ldots, t_i]$$

Where, $0\leq i\leq N-1$ $$t_i = -\frac{T_p}{2} + i \times \frac{1}{F_s}.$$

The linear interpolation is performed on the group delay vector according to the frequency axial vector $\vec{f}$, the time axial vector $\vec{t}$, to calculate the instantaneous frequency vector $\vec{F}$ as $$\vec{F}=(f_{t_0}, f_{t_1}, \ldots, f_{t_i})=\text{interp1}[\vec{g}, \vec{f}, \vec{t}]$$

The inter1$[\vec{g}, \vec{f}, \vec{t}]$ denotes a one-dimensional linear interpolation operator, particularly, correspondence between horizontal and vertical coordinates can be determined according to $(\vec{g}, \vec{f})$ within a two-dimensional coordinate plane, a vertical coordinate corresponding to a horizontal coordinate $\vec{t}$ calculated via linear interpolation is $$\vec{F}=\text{interp1}[\vec{g}, \vec{f}, \vec{t}]$$

Further, the vertical coordinate $f_{t_i}$ corresponding to the horizontal coordinate $t_i$ is $$f_{t_i} = \frac{g_p - g_q}{f_p - f_q} \times t_i.$$

The $t_i$ falls into an interval $[g_p, g_q]$, $0 \leq q \leq i \leq p \leq N-1$, and the $f_p$ is vertical coordinates corresponding to horizontal coordinates $g_p$ and the $f_q$ is vertical coordinates corresponding to horizontal coordinates $g_q$.

The instantaneous frequency vector 53 is configured to perform integrating according to the instantaneous frequency vector to obtain a signal phase vector $\vec{\phi} = [\phi_0, \phi_1, \ldots, \phi_i]$, specifically, when $i = 0$, $\phi_0 = 0$.

when $i = 1$, $\phi_1 = \pi(f_{t_1} + f_{t_0}) \times \dfrac{1}{F_s} + \phi_0$.

When $i = 2$, $\phi_2 = \pi(f_{t_2} + f_{t_1}) \times \dfrac{1}{F_s} + \phi_1$.

...

When $1 \leq i \leq N-1$, $\phi_i = \pi(f_{t_i} + f_{t_{i-1}}) \times \dfrac{1}{F_s} + \phi_{i-1}$.

Particularly, it may be appropriate to block to calculate the signal phase vector concurrently herein. For example, two blocks are provided to calculate $\vec{\phi}_1 = [\phi_0, \phi_1, \ldots, \phi_h]$ and $\vec{\phi}_2 = [\phi_{h+1}, \phi_{h+2}, \ldots, \phi_i]$, where $0 \leq h \leq i \leq N-1$. In a case where $\phi_0 = 0$ and $\phi_{h+1} = 0$ are set first, the $\vec{\phi}_1$ and the $\vec{\phi}_2$ are calculated by blocking according to an integration process in the step 404; then, a final value of the $\vec{\phi}_1$ serves as an initialized value of the $\vec{\phi}_2$ to obtain $\vec{\phi}_2 = [\phi_{h+1}, \phi_{h+2}, \ldots, \phi_i] + \phi_h$; and at last, the $\vec{\phi}_1$ and the $\vec{\phi}_2$ are directly spliced into an integral phase vector $\vec{\phi}$.

The integration module 54 is configured to determine a signal time domain discrete vector according to the phase vector. In some embodiments, the integration module 54 may include multiple integration blocks for integral calculation.

In some embodiments, the signal time domain discrete vector $\vec{s}$ may be denoted as $\vec{s} = [s_0, s_1, \ldots, s_i]$, where, $0 \leq i \leq N-1$ and $S_i = \exp(j2\pi\phi_i)$. The signal time domain discrete vector $\vec{s}$ is a digital signal obtained by FPGA calculation.

The conversion module 55 is configured to generate a discrete signal of the signal into a series digital signal, and perform digital-to-analog conversion on the series digital signal to obtain the NLFM signal.

Specifically, the conversion module 55 converts the digital signal generated by the discrete value of the signal into an analog signal, to form a corresponding satisfied NLFM signal. In this embodiment, the conversion module 55 may be implemented via a DAC and convert the digital signal into the analog signal.

Figure 6:
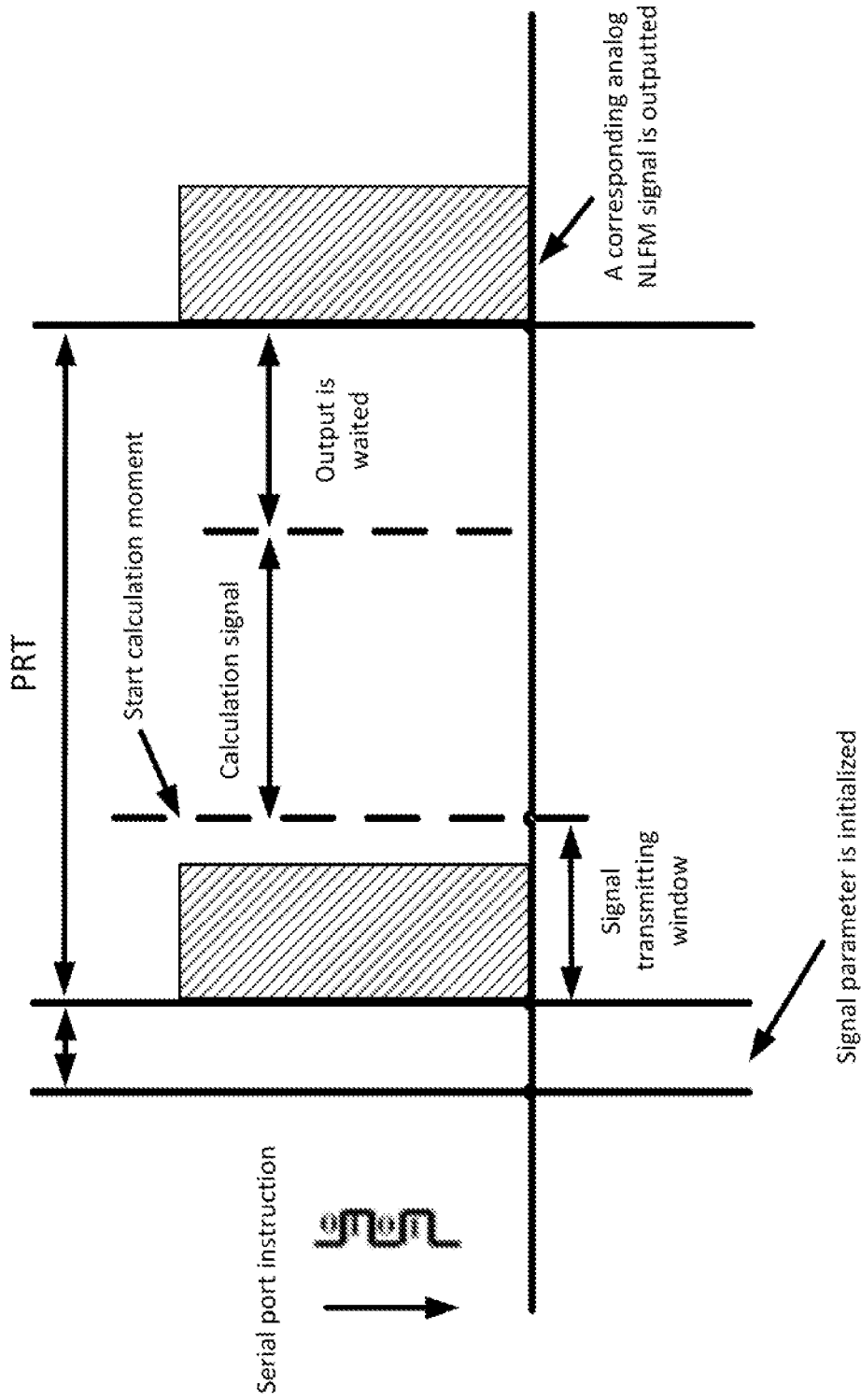
FIG. 6 schematically illustrates a time sequence for generating an NLFM signal based on an SAR system according to an embodiment of the disclosure.

The embodiments of the disclosure provide a time sequence structure for generating an NLFM signal based on an SAR system. The time sequence structure is as shown in FIG. 6, and specifically includes the following operations.

Upon the reception of a serial port instruction transmitted by an upper computer at some moment, a signal parameter is initialized first before the beginning of next Pulse Repetition Time (PRT). The calculation process is started at the end moment of a signal transmitting window for the next PRT, such that radar waveform data, which is stored in an RAM of an FPGA and will be transmitted in the next PRT, may not be covered; a signal is calculated, and upon the completion of the calculation of the corresponding NLFM signal, an output is waited; and the analog NLFM signal is outputted at a signal transmitting window for a further next PRT.

Figure 7:
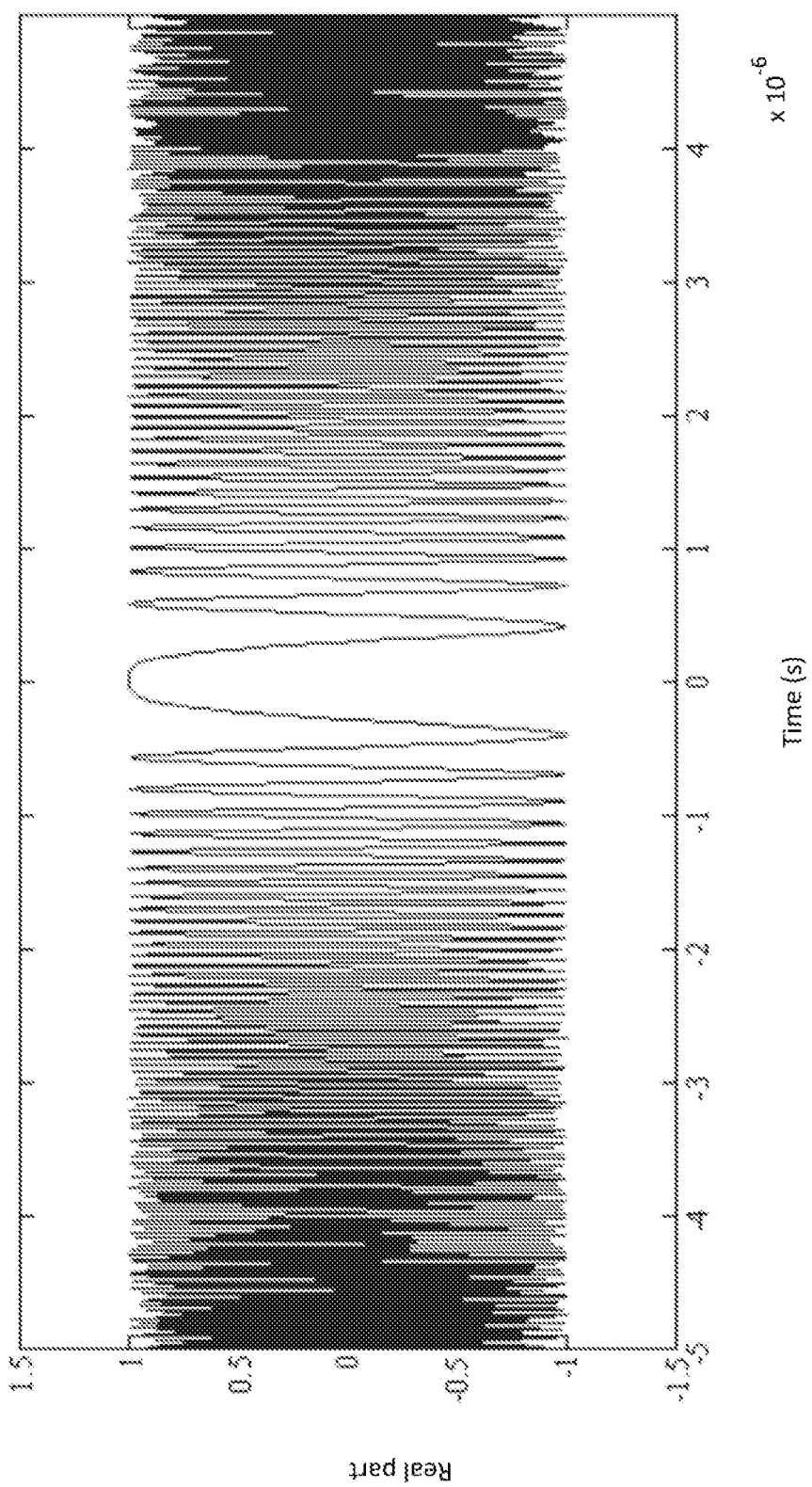
FIG. 7 is an image of a real part of a time domain signal of an analog signal result collected by an oscilloscope according to an embodiment of the disclosure.
Figure 8:
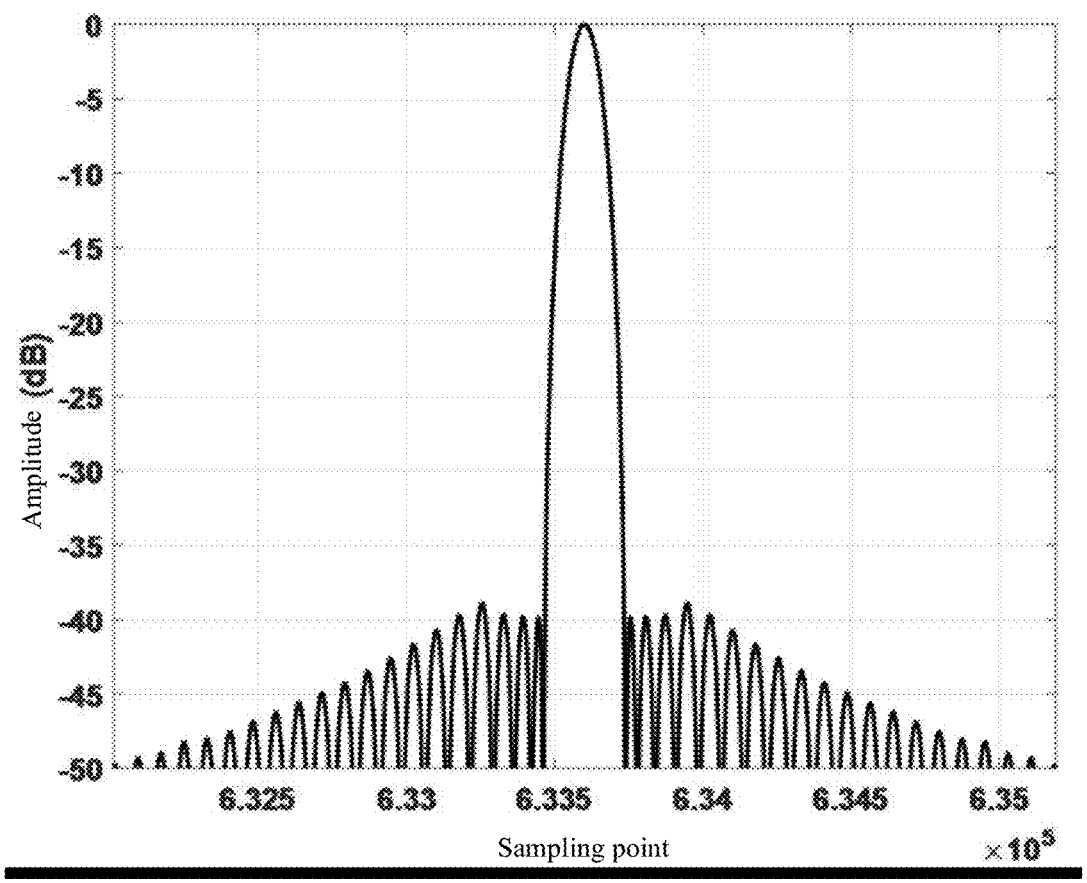
FIG. 8 is an image of a real part of a time domain signal after pulse compression according to an embodiment of the disclosure.

According to a calculation time sequence and an FPGA hardware architecture, an initialization parameter is selected as: 80 Mhz of signal bandwidth, and 20 us of signal pulse width. A −40 dB Taylor window function is selected as a power spectrum density function for initialization, and a system sampling rate is 90 MHz. An oscilloscope is used to collect a corresponding output analog signal result, with a real part of a time domain signal as shown in FIG. 7, and a pulse compression result as shown in FIG. 8. A comparison result between a measured value and a theoretical value for a performance index of the output NLFM signal is as shown in table 1.

TABLE 1

| Index parameter | Theoretical value | Measured value |
| --- | --- | --- |
| PSLR (dB) | −39.2 | −39.1 |
| 3-dB main lobe width (sampling point) | 1.23 | 1.23 |
| Integral side lobe ratio (dB) | −29.9 | −29.1 |

As can be seen from the above table, the measured value is close to the theoretical value, which indicates that the precision of the NLFM signal generated by the disclosure in actual applications is close to a theoretical value, and a high-precision technical effect is achieved.

The embodiments of the disclosure further provide a computer readable storage medium, which is configured to store a calculation program provided in the above embodiment, to implement the operations of the foregoing method. The computer readable storage medium may be a volatile memory or a nonvolatile memory, and may also include both the volatile memory and the nonvolatile memory. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc or a Compact Disc Read-Only Memory (CD-ROM); and the magnetic surface memory may be a tape memory or a disk memory. The volatile memory may be a Random Access Memory (RAM), and serves as an external high-speed cache. Through illustrative but not restrictive description, many forms of RAMs may be available, for example, a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The computer readable storage medium described in this embodiment of the disclosure is intended to include but not limited to these and any other suitable types of memories, and may also be various devices including any one or any combination of the above memories, such as a mobile phone, a computer, an intelligent household electrical appliance, and a server.

Each module provided in the embodiments of the application may be implemented in form of a computer program. The computer program may run in a processor. The program module formed by the computer program may be stored in a memory of a terminal. The computer programs are executed by the processor to implement the actions of the methods described in the embodiments of the application.

According to the method for generating the NLFM signal in real time and the apparatus implemented based on the FPGA provided by the embodiments of the disclosure, a signal parameter is initialized as required; a group delay vector is calculated according to a set power spectrum density function; linear interpolation is performed according to the group delay vector to determine an instantaneous frequency vector; a signal phase is obtained by integrating according to the instantaneous frequency vector; and a discrete value of a time domain signal is determined according to the signal phase. Therefore, the complexity of signal design is greatly reduced, and the NLFM signal suitable for an FPGA to generate in real time is achieved; and further, compared with an LFM signal, a transmitting power can be saved, an SNR loss is reduced, and thus the system performance is improved.

The method implements a technical effect that the NLFM signal is directly generated by means of calculation and digital-to-analog conversion; and by directly converting a calculation result into the NLFM signal, the method optimizes operations of storing, invoking and converting the calculation result, improves a speed for generating the NLFM signal, and implements a technical effect that the NLFM signal is generated in real time.

The above descriptions are only simplified embodiments of the disclosure and are not intended to limit the disclosure. For the person skilled in the art, the disclosure may have various modifications and changes. Any modification, equivalent replacement, improvement and the like made within a spirit and a principle of the disclosure should be included in a protection scope of the disclosure.

What is claimed is:

1. A method for generating a Non-Linear Frequency Modulation (NLFM) signal in real time, executed by an apparatus for generating the NLFM signal in real time comprising a processor, a memory and a digital to analog converter, the method comprising:
   determining a signal parameter of a signal according to a system parameter, wherein the signal parameter at least comprises: a signal bandwidth, a signal pulse width and a Peak Side Lobe Ratio (PSLR);
   determining a power spectrum density function according to the PSLR;
   calculating the power spectrum density function to obtain a group delay vector;
   calculating a frequency axial vector $\vec{f}$ according to a system sampling rate $F_s$,
   wherein $\vec{f} = [f_0, f_1, \ldots, f_i]$, where $$0 \leq i \leq N-1, f_i = -\frac{F_s}{2} + i \times \frac{F_s}{N};$$

calculating a time axial vector $\vec{t}$ according to the signal pulse width, wherein $\vec{t} = [t_0, t_1, \ldots, t_i]$, where $$0 \leq i \leq N-1, t_i = -\frac{T_p}{2} + i \times \frac{1}{F_s},$$

where $T_p$ denotes the signal pulse width;
   performing linear interpolation calculation on the group delay vector by using the frequency axial vector and the time axial vector, to obtain an instantaneous frequency vector;
   integrating the instantaneous frequency vector to obtain a phase vector $\vec{\phi}$, wherein $\vec{\phi} = [\phi_0, \phi_1, \ldots, \phi_i]$, where when i=0, $\phi_0=0$, when $$1 \leq i \leq N-1, \phi_i = \pi(f_{t_i} + f_{t_{i-1}}) \times \frac{1}{F_s} + \phi_{i-1};$$

determining a signal time domain discrete vector according to the phase vector; and
   generating a digital signal according to the signal time domain discrete vector, and performing digital-to-analog conversion on the digital signal via the digital to analog converter to obtain the NLFM signal,
   wherein calculating the power spectrum density function to obtain the group delay vector comprises:
   calculating a group delay according to $$G(f) = \int_0^f \frac{P(f)}{C} df,$$

where G(f) denotes group delay function, f denotes a frequency, P(f) denotes a power spectrum density function with the frequency as an independent variable, C is an inverse proportional coefficient, $$C = \frac{1}{T_p} \int_{B/2}^{-B/2} P(f) df,$$

where B denotes the signal bandwidth;
   using discrete integration to demote the group delay as a group delay vector $\vec{g} = (g_0, g_1, \ldots, g_i)$, where, $0 \leq i \leq N-1$, the $g_i$ denotes a discrete value of G(f) and the N is the number of sampling points; and $N = \lfloor F_s T_p \rfloor$, where the $\lfloor \cdot \rfloor$ denotes to round down;
   selecting a Taylor window function as the power spectrum density function and denoting a corresponding group delay function as $$G(f) = \frac{T_p}{B} f + \sum_{m=1}^{\overline{m}-1} \frac{F_m T_p}{\pi m} \sin\left(\frac{2\pi m}{B} f\right),$$

where $F_m$ is a Taylor window coefficient, the $\vec{m}$ is the number of side lobes having a same height, and the m is a calculation process quantity.

2. The method of claim 1, wherein the determining the power spectrum density function according to the PSLR comprises:
   obtaining a window function corresponding to the PSLR according to the PSLR, and determining the power spectrum density function according to the window function.

3. The method of claim 1, wherein the calculating the power spectrum density function to obtain the group delay vector comprises:
performing discrete integration on the power spectrum density function to obtain the group delay vector.

4. The method of claim 3, wherein
the performing linear interpolation calculation on the group delay vector by using the frequency axial vector and the time axial vector to obtain an instantaneous frequency vector comprises:
dividing the group delay vector into n group delay subvectors, n being a positive integer greater than 1; and
performing, by using the frequency axial vector and the time axial vector, the linear interpolation calculation on the n group delay subvectors respectively, to obtain n instantaneous frequency vectors; and
the integrating the instantaneous frequency vector to obtain a phase vector comprises:
integrating the n instantaneous frequency vectors respectively, and splicing integrated results to obtain the phase vector.

5. An apparatus for generating a Non-Linear Frequency Modulation (NLFM) signal in real time, comprising:
a processor;
a memory for storing instructions; and
a digital to analog converter,
wherein the processor is configured to execute the instructions to perform the following operations:
determining a signal parameter of a signal according to a system parameter, the signal parameter at least comprising: a signal bandwidth, a signal pulse width and a Peak Side Lobe Ratio (PSLR);
determining a power spectrum density function according to the PSLR;
calculating the power spectrum density function to obtain a group delay vector;
calculating a frequency axial vector $\vec{f}$ according to a system sampling rate $F_s$, wherein $\vec{f}=[f_0, f_1, \ldots, f_i]$, where $$0 \le i \le N-1, f_i = -\frac{F_s}{2} + i \times \frac{F_s}{N};$$

calculating a time axial vector t according to the signal pulse width, wherein
$\vec{t}=[t_0, t_1, \ldots, t_i]$, where $$0 \le i \le N-1, t_i = -\frac{T_p}{2} + i \times \frac{1}{F_s},$$

where $T_p$ denotes the signal pulse width;
performing linear interpolation calculation on the group delay vector by using the frequency axial vector and the time axial vector to obtain an instantaneous frequency vector;
integrating the instantaneous frequency vector to obtain a phase vector $\vec{\phi}$, wherein $\vec{\phi}=[\phi_0, \phi_1, \ldots, \phi_i]$, where when i=0, $\phi_0=0$, when $$1 \le i \le N-1, \phi_i = \pi(f_{t_i} + f_{t_{i-1}}) \times \frac{1}{F_s} + \phi_{i-1};$$

determining a signal time domain discrete vector according to the phase vector; and
generating a digital signal according to the signal time domain discrete vector, and performing digital-to-analog conversion on the digital signal to obtain the NLFM signal via the digital to analog converter,
wherein the processor is further configured to:
calculate a group delay according to $$G(f) = \int_0^f \frac{P(f)}{C} df,$$

where G(f) denotes group delay function, f denotes a frequency, P(f) denotes a power spectrum density function with the frequency as an independent variable, C is an inverse proportional coefficient, $$C = \frac{1}{T_p} \int_{-B/2}^{-B/2} P(f) df,$$

where B denotes the signal bandwidth;
use discrete integration to demote the group delay as a group delay vector $\vec{g}=(g_0, g_1, \ldots, g_i)$, where, $0 \le i \le N-1$, the $g_i$ denotes a discrete value of G(f) and the N is the number of sampling points; and $N=\lfloor F_s T_p \rfloor$, where the $\lfloor \cdot \rfloor$ denotes to round down;
select a Taylor window function as the power spectrum density function and denote a corresponding group delay function as $$G(f) = \frac{T_p}{B} f + \sum_{m=1}^{m-1} \frac{F_m T_p}{\pi m} \sin\left(\frac{2\pi m}{B} f\right),$$

where $F_m$ is a Taylor window coefficient, the $\vec{m}$ is the number of side lobes having a same height, and the m is a calculation process quantity.

6. The apparatus of claim 5, wherein the processor is further configured to execute the instructions to: obtain a window function corresponding to the PSLR according to the PSLR, and determine the power spectrum density function according to the window function.

7. The apparatus of claim 5, wherein the processor is further configured to execute the instructions to: perform discrete integration on the power spectrum density function to obtain the group delay vector.

8. The apparatus of claim 7, wherein the processor is further configured to execute the instructions to: divide the group delay vector into n group delay subvectors, n is a positive integer greater than 1; perform, by using the frequency axial vector and the time axial vector, the linear interpolation calculation on the n group delay subvectors respectively, to obtain n instantaneous frequency vectors; and integrate the n instantaneous frequency vectors respectively, and splice integrated results to obtain the phase vector.

9. A non-transitory computer readable storage medium having computer programs stored thereon, wherein the computer programs, when being executed by an apparatus for generating a Non-Linear Frequency Modulation (NLFM) signal comprising a processor, a memory and a digital to analog converter, cause the processor to execute the following operations:

determining a signal parameter of a signal according to a system parameter, wherein the signal parameter at least comprises: a signal bandwidth, a signal pulse width and a Peak Side Lobe Ratio (PSLR);

determining a power spectrum density function according to the PSLR;

calculating the power spectrum density function to obtain a group delay vector;

calculating a frequency axial vector $\vec{f}$ according to a system sampling rate $F_s$, wherein $\vec{f}=[f_0, f_1, \ldots, f_i]$, where $$0 \leq i \leq N-1, f_i = -\frac{F_s}{2} + i \times \frac{F_s}{N};$$

calculating a time axial vector according to the signal pulse width, wherein $\vec{t}=[t_0, t_1, \ldots, t_i]$, where $$0 \leq i \leq N-1, t_i = -\frac{T_p}{2} + i \times \frac{1}{F_s},$$

where $T_p$ denotes the signal pulse width;

performing linear interpolation calculation on the group delay vector by using the frequency axial vector and the time axial vector to, obtain an instantaneous frequency vector;

integrating the instantaneous frequency vector to obtain a phase vector $\vec{\phi}$, wherein $\vec{\phi}=[\phi_0, \phi_1, \ldots, \phi_i]$, where when i=0, $\phi_0=0$, when $$1 \leq i \leq N-1, \phi_i = \pi(f_{t_i} + f_{t_{i-1}}) \times \frac{1}{F_s} + \phi_{i-1};$$

determining a signal time domain discrete vector according to the phase vector; and generating a digital signal according to the signal time domain discrete vector, and performing digital-to-analog conversion on the digital signal via the digital to analog converter to obtain the NLFM signal, wherein calculating the power spectrum density function to obtain the group delay vector comprises:

calculating a group delay according to $$G(f) = \int_0^f \frac{P(f)}{C} df,$$

where G(f) denotes group delay function, f denotes a frequency, P(f) denotes a power spectrum density function with the frequency as an independent variable, C is an inverse proportional coefficient, $$C = \frac{1}{T_p} \int_{B/2}^{-B/2} P(f) df,$$

where B denotes the signal bandwidth;

using discrete integration to demote the group delay as a group delay vector $\vec{g}=(g_0, g_1, \ldots, g_i)$, where, $0 \leq i \leq N-1$, the $g_i$ denotes a discrete value of G(f) and the N is the number of sampling points; and $N=\lfloor F_s T_p \rfloor$, where the $\lfloor \cdot \rfloor$ denotes to round down;

selecting a Taylor window function as the power spectrum density function and denoting a corresponding group delay function as $$G(f) = \frac{T_p}{B} f + \sum_{m=1}^{\bar{m}-1} \frac{F_m T_p}{\pi m} \sin\left(\frac{2\pi m}{B} f\right),$$

where $F_m$ is a Taylor window coefficient, the $\vec{m}$ is the number of side lobes having a same height, and the m is a calculation process quantity.

10. The non-transitory computer readable storage medium according to clam 9, wherein the computer programs, when being executed by a processor, cause the processor to obtain a window function corresponding to the PSLR according to the PSLR, and determine the power spectrum density function according to the window function.

11. The non-transitory computer readable storage medium according to clam 9, wherein the computer programs, when being executed by a processor, cause the processor to perform discrete integration on the power spectrum density function to obtain the group delay vector.

12. The non-transitory computer readable storage medium according to clam 11, wherein the computer programs, when being executed by a processor, cause the processor to: divide the group delay vector into n group delay subvectors, n is a positive integer greater than 1; perform, by using the frequency axial vector and the time axial vector, the linear interpolation calculation on the n group delay subvectors respectively, to obtain n instantaneous frequency vectors; and integrate the n instantaneous frequency vectors respectively, and splice integrated results to obtain the phase vector.

* * * * *